United States Patent [19]

Wang et al.

[11] Patent Number: 5,122,165

[45] Date of Patent: Jun. 16, 1992

[54] REMOVAL OF VOLATILE COMPOUNDS AND SURFACTANTS FROM LIQUID

[75] Inventors: Lawrence K. Wang, Latham; Orest Hrycyk, Syracuse, both of N.Y.; Lubomyr Kurylko, New Providence, N.J.

[73] Assignee: International Environmental Systems, Inc., Pittsfield, Mass.

[21] Appl. No.: 715,992

[22] Filed: Jun. 11, 1991

Related U.S. Application Data

[63] Continuation-in-part of Ser. No. 550,377, Jul. 10, 1990.

[51] Int. Cl.⁵ .................. B01D 19/00; B01D 53/04
[52] U.S. Cl. ............................. 55/38; 55/47; 55/51; 55/53; 55/70; 55/71; 55/73; 55/74; 55/183; 55/196; 55/279; 55/387
[58] Field of Search ............... 55/38, 44, 47, 51, 53, 55/68, 74, 75, 1, 45, 70, 178, 183, 185, 189, 196, 279, 71, 73; 210/681, 806

[56] References Cited

U.S. PATENT DOCUMENTS

| | | | |
|---|---|---|---|
| 3,434,968 | 3/1969 | Lowe | 55/178 X |
| 3,782,115 | 1/1974 | Johnson | 55/1 X |
| 3,920,419 | 11/1975 | Schroeder et al. | 55/70 |
| 3,946,534 | 3/1976 | Egly | 55/38 X |
| 4,093,544 | 6/1978 | Ross | 55/70 X |
| 4,120,816 | 10/1978 | de Lautrec et al. | 55/178 |
| 4,271,013 | 6/1981 | Bhattacharya | 55/70 X |
| 4,323,372 | 4/1982 | Bentz et al. | 55/68 X |
| 4,407,717 | 10/1983 | Teletzke et al. | 210/616 |
| 4,623,464 | 11/1986 | Ying et al. | 210/631 X |
| 4,627,922 | 12/1986 | Viator et al. | 55/45 X |
| 4,632,676 | 12/1986 | Mosebach et al. | 55/70 X |
| 4,657,680 | 4/1987 | Zibrida | 55/70 X |
| 4,689,054 | 8/1987 | Vara et al. | 55/74 X |
| 4,715,965 | 12/1987 | Sigerson et al. | 55/74 X |
| 4,738,754 | 4/1988 | Hilsebein et al. | 55/70 X |
| 4,746,440 | 5/1988 | Seeger | 55/45 X |
| 4,752,306 | 5/1988 | Henriksen | 55/38 |
| 4,752,399 | 6/1988 | Viator et al. | 55/45 X |
| 4,755,296 | 7/1988 | Ying et al. | 210/631 |
| 4,810,386 | 3/1989 | Copa et al. | 210/616 |
| 4,816,040 | 3/1989 | Bonville et al. | 55/70 X |
| 4,820,318 | 4/1989 | Chang et al. | 55/68 |
| 4,846,852 | 7/1989 | Schweitzer et al. | 55/74 X |
| 4,847,057 | 7/1989 | Brugerolle et al. | 55/70 X |
| 4,857,198 | 8/1989 | Meidl | 210/603 |
| 4,859,216 | 8/1989 | Fritsch | 55/74 X |
| 4,892,664 | 1/1990 | Miller | 55/53 X |
| 4,937,004 | 6/1990 | Mandrin et al. | 55/53 X |
| 4,952,316 | 8/1990 | Cooley | 210/616 |
| 4,956,093 | 9/1990 | Pirbazari et al. | 210/616 |
| 4,966,611 | 10/1990 | Schumacher et al. | 55/74 X |

FOREIGN PATENT DOCUMENTS 2127711 4/1984 United Kingdom .............. 55/47

OTHER PUBLICATIONS

O'Brien, R. P. and J. L. Fisher. "There is an Answer to Groundwater Contamination." Water/Engineering & Management, May 1983.
O'Brien, R. P. and M. H. Stenzel. "Combining Granular Activated Carbon and Air Stripping." Public Works, Dec., 1984.
Stenzel, M. H. and U.S. Gupta. "Treatment of Contaminated Groundwaters with Granular Activated Carbon and Air Stripping." Journal of the Air Pollution Control Assoc., Dec., 1985.

*Primary Examiner*—Robert Spitzer

[57] ABSTRACT

A process system and apparatus for removal of toxic volatile organic compounds (VOCs), volatile inorganic compounds (VICs) and surfactants from a contaminated liquid stream, more particularly groundwater, by a combination of pH adjustment, chemical reaction, ultraviolet reaction, gas stripping, scrubbing, adsorption and regeneration is described. This process system involves liquid pumping; liquid treatment in an enclosed dispersed gas stripping chamber; gas purification by a foam collector, a wet scrubber and a self-generative gas-phase granular activated carbon (GAC) contactor; and recycling of GAC-purified gas for further liquid treatment by dispersed gas stripping. The process system is extremely cost-effective for removal of VOCs, VICs, and surfactants, and eliminates the problem of secondary gas contamination caused by conventional air stripping towers.

25 Claims, 2 Drawing Sheets

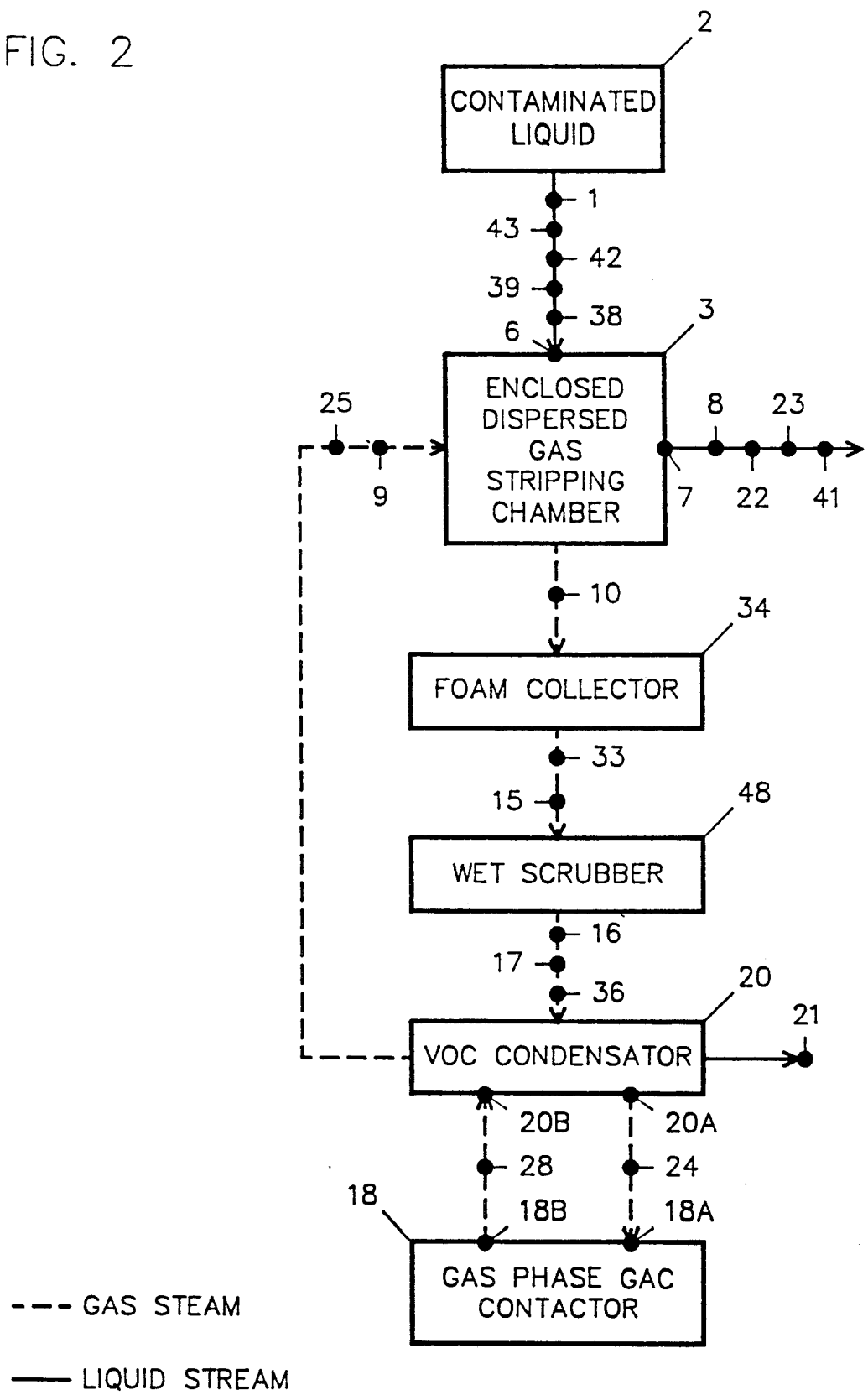

REMOVAL OF VOLATILE COMPOUNDS AND SURFACTANTS FROM LIQUID

This application is a continuation-in-part of application Ser. No. 550,377, filed Jul. 10, 1990.

BACKGROUND OF THE INVENTION

1. Field of the Invention

The present invention relates to a process system for treating a contaminated liquid, more particularly groundwater, to remove toxic volatile organic compounds (VOCs), objectionable volatile inorganic compounds (VICs) and surfactants from said liquid. The process system of this invention removes VOCs, VICs and surfactants in one apparatus and represents a low cost and highly effecient alternative to present groundwater treatment technology which is expensive and causes secondary air pollution.

About 70 percent of potable water in the U.S.A. is supplied by groundwater. Groundwater contamination, which is a national major concern, is about 71 percent caused by industrial accidents (chemical spills, tank leaks, etc.), 16 percent caused by railroad or truck's chemical accidents, and 13 percent caused by leachates from lagoons or dumpsites.

The primary reasons for treating groundwater are: potable use (39 percent), clean-up of aquifer to prevent spread of contamination (48 percent), and industrial and commercial use (13 percent). In any case, the potentially hazardous VOCs must be removed. Timely cleanup of aquifer to prevent spread of contamination is extremely important because the damage can be beyond repair if the spread of contamination is too wide.

Toxic organic compounds commonly found in groundwater include, but are not limited to, the following:

| Organic Compounds in Groundwater | Percent of Occurrences | Concentration Range |
|---|---|---|
| Carbon tetrachloride | 5 | 130 ug/l–10 mg/l |
| Chloroform | 7 | 20 ug/l–3.4 mg/l |
| Dibromochloropropane | 1 | 2-5 mg/l |
| DDE | 1 | 1 ug/l |
| DDT | 1 | 4 ug/l |
| CIS-1,2-dichloroethylene | 11 | 5 ug/l–4 mg/l |
| Dichloropentadiene | 1 | 450 ug/l |
| Diisopropyl ether | 3 | 20-34 ug/l |
| Tertiary methyl-butylether | 1 | 33 ug/l |
| Diisopropyl methyl phosphonate | 1 | 1,250 ug/l |
| 1,3-dichloropropene | 1 | 10 ug/l |
| Dichloroethyl ether | 1 | 1.1 mg/l |
| Dichloroisopropylether | 1 | 0.8 mg/l |
| Benzene | 3 | 0.4-11 mg/l |
| Acetone | 1 | 10-100 ug/l |
| Ethyl acrylate | 1 | 200 mg/l |
| Trichlorotrifloroethane | 1 | 6 mg/l |
| Methylene chloride | 3 | 1-21 mg/l |
| Phenol | 3 | 63 mg/l |
| Orthochlorophenol | 1 | 100 mg/l |
| Tetrachloroethylene | 13 | 5 ug/l–70 mg/l |
| Trichloroethylene | 20 | 5 ug/l–16 mg/l |
| 1,1,1-trichloroethane | 8 | 60 ug/l–25 mg/l |
| Vinylidiene chloride | 3 | 5 ug/l–4 mg/l |
| Toluene | 1 | 5-7 mg/l |
| Xylenes | 4 | 0.2-10 mg/l |
| EDB | 1 | 10 ug/l |
| Others | 1 | NA |

Other common contaminants in groundwater include: volatile inorganic compounds (VICs), surfactants, iron, manganese, calcium hardness, magnesium hardness, coliform bacteria, and virus.

The present technologies for groundwater treatment include: air stripping tower without air emission control, non-regenerative gas phase granular activated carbon, chemical oxidation, non-regenerative liquid phase granular activated carbon, active charcoal fiber, biological processes, ion exchange, ultrafiltration, $H_2O_2$ treatment, reverse osmosis (RO), ozonation, lime softening, ultraviolet (UV), chemical coagulation, sedimentation, filtration and chlorination. Air stripping tower without air emission control is the most common process for VOCs removal, but is not acceptable in many states. Liquid-phase granular activated carbon (GAC) contactor is technically feasible for water purification, but may be economically unfeasible when it is used alone. Chemical oxidation alone or UV alone is not cost-effective for VOCs reduction. Certain chemicals may even give undesirable residuals. Ultrafiltration and RO are excellent post-treatment process, requiring adequate pretreatment for cost reduction. Biological process is very efficient for removal of organic contaminants, but causes air pollution and requires thorough disinfection.

While conventional ozonation, UV, RO and chlorination are all effective disinfection processes, they all require separate reactors.

The present invention represents a package apparatus for removal of VOCs, VICs and surfactants, and is also an efficient and cost-effective groundwater purification system which considers the affordability, performance, governmental acceptance, secondary pollution elimination and simplicity in operation.

2. Description of the Prior Art

The most common process system for removal of volatile organic compounds (VOCs) from groundwater includes flow equalization, pH adjustment, chemical coagulation, flocculation, sedimentation, filtration, conventional air stripping tower, liquid phase granular activated carbon (GAC) adsorption, and gas phase granular activated carbon adsorption. Conventional air stripping tower can also be replaced by ozonation, ultraviolet (UV), and hydrogen peroxide for VOCs reduction.

Flow equalization requires a separate equalization tank. Chemical coagulation and pH adjustment are done in a rapid mixing tank.

Flocculation is accomplished in a slow mixing tank. Sedimentation clarifier generally requires long detention time, and a large land space. Filtration is the tertiary pretreatment prior to conventional air stripping tower. pH adjustment is an important pretreatment step for ammonia removal. Chemical coagulation, flocculation, sedimentation and filtration together are required for reduction of iron, manganese and hardness prior to conventional air stripping and conventional liquid phase GAC for VOC removal.

Conventional air stripping tower is a simple desorption process used to lower the VOCs of a liquid stream. In the process, the contaminated liquid is pumped to the top of a tall packed tower with a countercurrent flow of air drawn through the bottom openings. VOCs are stripped from the falling water droplets into the air stream which is then discharged to the atmosphere. The effluent of air stripping tower is thus purified to lower VOCs and ammonia. For removal of ammonia which is a VIC, lime or caustic soda must be added in a pretreatment tank prior to the conventional air stripping to raise the pH of the liquid to the range of 10.8 to 11.5 converting essentially all ammonium ions to ammonia gas which can then be stripped by air. For removal of VOCs and ammonium ions, a pretreatment process system comprising of chemical coagulation/flocculation, sedimentation and filtration, is generally required prior to the conventional air stripping tower to remove iron, manganese and hardness which, otherwise, will clog the conventional air stripping tower, in turn, will reduce air stripping efficient. Conventional air stripping towers do not recycle their gaseous effluent; therefore, they require air emission control facilities. In addition to high capital cost, conventional air stripping towers have other problems and limitations: (a) poor efficiency in cold weather locations having air temperature below 10 degree C.; (b) not working in freezing conditions unless sufficient heated air is available; (c) objectionable air emission due to ammonia and VOCs discharge into air environment; (d) poor removal efficiency when VOCs and ammonia concentrations in the liquid are low; (e) scale formation due to high iron, manganese and hardness contents in the liquid; (f) objectional tall construction, (g) process restriction for simultaneous combined treatment using chemicals and ultraviolet lights (UV), and (h) incapable of removing surfactants.

The gaseous effluent from a conventional air stripping tower is generally treated by gas phase granular activated carbon (GAC) contactors which can not be regenerated in-situ for reuse.

The liquid effluent from a conventional air stripping tower is commonly further treated by a liquid phase GAC contactor which can not be regenerated in-situ for reuse, and therefore its operating cost is high.

The process system and apparatus of this invention significantly simplifies the process system for removal of volatile organic and inorganic compounds from groundwater or other liquids. The flow equalization, pH adjustment, chemical coagulation, enclosed dispersed gas stripping, supplemental chemical oxidation, UV, recycled gas emission control, wet scrubbing, and GAC regeneration are all accomplished in one package unit for cost saving. The post-treatment for final polishing of the liquid stream by a liquid phase GAC contactor can be added, but is no longer absolutely required. Besides, both the liquid phase GAC for liquid treatment and the gas phase GAC for gas emission control are regenerative in situ for reuse and further cost saving. Recycling of purified gas, for reuse in the enclosed dispersed air stripping reactor eliminates the air pollution problem.

Conventional air stripping tower can not be cost-effectively operated in conjunction with ozonation, UV and hydrogen peroxide because separate reactors are required. The enclosed dispersed gas stripping chamber of the present invention, however, incorporates pH adjustment, gas stripping, ozonation, UV and hydrogen peroxide treatment into one reactor for more efficient removal of both VOCs and VICs.

In order to clarify the dissimilarities between the present invention and the prior arts, many direct and cross references are reviewed and cited.

Prior process for substantially eliminating dissolved oxygen from a liquid and from a shipping container is described in U.S. Pat. No. 3,946,534, issued Mar. 30, 1976 to Richard S. Egly, which relates to repeated operation by purging the container with inert gas, pressurizing with the gas and then releasing the pressure and repeating the steps for a plurality of times. Egly's patent is particularly directed to elimination of oxygen gas from a liquid, rather than to elimination of toxic volatile organics and volatile inorganics (such as ammonia) from a liquid. However, it is important to illustrate the development of the gas stripping art leading to the present disclosure.

Prior process for recovering volatile organics from exhaust gases or spent air containing these compounds using a layer of silica containing adsorbents is shown in U.S. Pat. No. 4,323,372 issued Apr. 6, 1982, to Rolf Bentz et al. The present invention relates to a process and apparatus for removing VOCs, VICs and surfactants from a liquid and also for automatic gas emission control using a foam collector, a wet scrubber and a gas phase GAC contactor which has self-regeneration capability and recycles its purified effluent for the purpose of gas stripping in an enclosed chamber.

A prior process for treating liquid with powdered adsorbent, and one or more biological packed towers is described in U.S. Pat. No. 4,407,717 issued Oct. 4, 1983 to Gerald H. Teletzke et al. The present invention discloses an improved liquid treatment process and apparatus using an enclosed dispersed gas stripping chamber, a foam collector, a wet scrubber and GAC contactors, but no biological packed towers.

The method and process for combined physicochemical and biological treatment of wastewater using powdered activated carbon (PAC) in an open sequencing batch reactor (SBR) is disclosed by Wei-Chi Ying et al in U.S. Pat. No. 4,623,464 issued Nov. 18, 1986, and in U.S. Pat. No. 4,755,296, issued Jul. 5, 1988. Their method and process removes VOCs from wastewater by PAC adsorption and biological reaction, and converts ammonia (VIC) to nitrate ions. The present invention relates to an enclosed reactor for gas stripping, disinfection and gas emission control, and for direct removal of ammonia and surfactant. Besides the present invention is feasible for drinking water treatment, wastewater treatment or groundwater decontamination.

An air purification process is disclosed by Thomas E. Vara et al in U.S. Pat. No. 4,689,054, issued Aug. 25, 1987. The Vara process includes the steps of particulate filtration, adsorption, desorption, separation, incineration and venting. The present invention does not include the steps of particulate filtration, separation, incineration and venting, and relates to groundwater decontamination, potable water treatment and industrial effluent treatment which all with built-in air emission control.

A system for treatment of and mass transfer in liquid/gas mixtures, especially removal of oxygen from seawater, is disclosed by Norolf Henriksen in U.S. Pat. No. 4,752,306, issued Jun. 21, 1988. Henriksen's patent involves oxygen removal by an inert stripping gas. The present invention relates to utilization of air or oxygen for oxidation of ferrous iron and manganese, and for stripping mainly VOCs and VICs from groundwater, in which oxygen is added, not reduced.

A method for separating volatilizable contaminants from soil is disclosed by Adam L. Sigerson et al in U.S. Pat. No. 4,715,965, issued Dec. 29, 1987, which does not relate to the enclosed dispersed air stripping for both liquid treatment and gas emission control as in the case of the present invention.

A two-stage process for purifying wastewater containing organic and adsorbable pollutants in open tanks is disclosed by William M. Copa et al in U.S. Pat. No. 4,810,386, issued Mar. 7, 1989. Their disclosed process includes the steps of aerating the wastewater in the presence of powdered activated carbon (PAC) and biologically active solids in aeration zone, and subsequently settling the suspended solids by gravity in quiescent zone. Their oxygen is provided only for biological growth in opened tanks. The present invention relates to mainly physical separation of VOCs, VICs and surfactants by innovative gas bubble stripping (with any kind of gas) in an enclosed reactor, and physical adsorption of VOCs by regenerative GAC, and chemical adsorption of VICs.

Chang et al disclose a process for removal of volatile organic compounds from vapor streams using a binderless carbon molecular sieve adsorbent in U.S. Pat. No. 4,820,318, issued Apr. 11, 1989. Another method and apparatus for separating and recovering volatile solvents from vapor streams also using molecular sieve adsorbent is disclosed by Stefan Schweitzer et al in U.S. Pat. No. 4,846,852, issued Jul. 11, 1983. The present invention relates to a process for removal of both VOCs and VICs from both liquid and gas streams by gas stripping UV, scrubbing and regenerative GAC.

Still another method and equipment for recovering volatile organic compounds (VOCs) from exhaust waste gas using active charcoal in fiber form is disclosed by Georges Fritsch in U.S. Pat. No. 4,859,216, issued Aug. 22, 1989. Fritsch's patent further relates to adsorption-desorption steps for active charcoal fiber regeneration and a recirculation step for the gaseous regenerating fluid through the system. The present invention relates to an enclosed dispersed gas stripping process for mainly liquid treatment with built-in gas emission control, and utilizes combined pH adjustment, chemical reaction, UV, stripping, absorptive scrubbing, and regenerative GAC adsorption (instead of active charcoal fiber adsorption) to remove VOCs, VICs and surfactants from a liquid (instead of removing only VOCs from an exhaust waste gas). Furthermore, in the case of the present invention, the purified gas stream (instead of the gaseous regenerating fluid) is recirculated to the enclosed dispersed gas stripping chamber for liquid treatment.

Meidl discloses a process system for water decontamination by conventional air stripping tower, biological open reactor containing PAC, sedimentation/thickening and wet air oxidation, in U.S. Pat. No. 4,857,198, issued Aug. 15, 1989. The present invention relates to a liquid treatment process system comprising the steps of enclosed dispersed air stripping, GAC adsorption, scrubbing, chemical reaction, and UV, which are aimed at VOCs and VICs removals.

A similar method and system for decontaminating groundwater or other water, is disclosed by Paul C. Miller in U.S. Pat. No. 4,892,664, issued Jan. 9, 1990. Miller's patent relates a process comprising of conventional air stripping tower for groundwater treatment and catalytic oxidation for air purification. Conventional air stripping tower requires pretreatment for pH adjustment, and removal of iron, manganese, and hardness, and requires post-treatment for disinfection. Besides, conventional air stripping tower removes only VOCs and can not receive the gaseous effluent from catalytic oxidation for repeated air stripping. The present invention relates to mainly the enclosed dispersed gas stripping reactor for removal of VOCs, VICs and surfactants from a liquid. The enclosed dispersed gas stripping as in the case of the present invention has built-in pretreatment, post-treatment and recirculating air emission control capabilities.

The method for the deoxidation of chlorinated water, more particularly sea water, by means of a low oxygen content stripping gas and a liquid absorbent is disclosed by Charles Mandrin et al in U.S. Pat. No. 4,937,004, issued Jun. 26, 1990. The present invention relates to a process for removal of both VOCs and VICs (instead of chlorine only) from a liquid (instead of specifically chlorinated sea water) by means of a high oxygen content stripping gas (instead of a low oxygen content stripping gas).

A single-stage continuous aeration-batch sedimentation clarification process in open tanks for purifying wastewater is disclosed by Curtis D. Cooley in U.S. Pat. No. 4,952,316, issued Aug. 28, 1990. Cooley's patent further relates to the use of PAC in the aeration step. The present invention relates to the enclosed dispersed air stripping process (instead of aeration-sedimentation clarification in open tanks) for both liquid treatment as well as air emission control (instead of only for liquid treatment), and also relates to GAC contactors (instead of only PAC). Furthermore, Cooley's process is only for purifying wastewater. The process disclosed by the present inventors is feasible for drinking water treatment, groundwater decontamination, and industrial effluent treatment.

A continuous chemical pretreatment, aeration and ultrafiltration process for purifying dairy wastewater is disclosed by Massoud Pirbazari et al in U.S. Pat. No. 4,956,093, issued Sep. 11, 1990. Their patent also relates to the use of PAC in the aeration step. The present invention is mainly for treatment of either potable water or non-potable water (instead of only dairy wastewater) by an enclosed dispersed air stripping reactor (instead of an open aeration tank containing biological solids and PAC) and GAC contactors (instead of PAC alone). Furthermore, the process disclosed by the present inventors does not require the use of a chemical pretreatment tank and an ultrafiltration post-treatment unit.

Schumacher et al disclose an apparatus and process for adsorbing VOCs from the flue gas of a combustion unit in one reactor and regenerating adsorbent material in another reactor both for air emission control. Their process system specifically includes adsorption, combustion, humidification, condensation, and heating. The present invention relates to stripping both VOCs and VICs from liquid by an enclosed dispersed air stripping reactor, adsorbing/absorbing VOCs from the gaseous reactor effluent, adsorbing the remaining VOCs from the liquid reactor effluent, regenerating GAC, and recycling the purified gas stream for further stripping.

SUMMARY OF THE INVENTION

In accordance with the present invention, an improved process system for removing volatile organic compounds (VOCs), volatile inorganic compounds (VICs) and surfactants (or surface active agents) from a contaminated liquid comprises the following steps:

discharging the contaminated liquid by pumping or gravity into an enclosed dispersed gas stripping chamber (or reactor) which is equipped with a liquid inlet, a liquid outlet, liquid drains, a gas inlet, a gas outlet, gas release valves, a sparger system, a vacuum breaker, a manhole with cover, an enclosure, chemical feeders, ultraviolet (UV) tubes, vacuum/pressure gauges, a demister pad, a liquid flow meter, a gas flow meter, a gas mover, a foam collector, a VIC wet scrubber, a VOC condensator, a condensed VOC collector, a gas phase granular activated carbon (GAC) contactor, operating valves, regenerating valves, sampling ports, and a gas feed point, adjusting the hydraulic residence time to conform to different influent liquid flow rates and providing sufficient gas head space above the liquid level in said chamber, feeding liquid chemicals and gas chemicals (including ozone) and turning on the UV tubes for combined pH adjustment, chemical reactions and UV reaction in said chamber, bubbling gas mixture up through spargers (on said sparger system located at bottom of said chamber) into liquid phase with a low pressure and low volume gas mover, stripping VOCs, VICs and surfactants from liquid phase into gas/foam phase in said chamber by gas bubbles, sucking the gas effluent containing VOCs, VICs and surfactants from the gas outlet of said chamber by one or more said gas movers, transporting said gas effluent by the gas mover through a foam collector for removal of surface-active foams, through a wet scrubber for removal of VICs, through the demister pad for removal of liquid droplets, through a VOC condensator twice for VOCs condensation, through a gas phase granular activated carbon (GAC) contactor for further removal of VOCs, and through the gas inlet for re-entering said sparger system, supplying the make-up gas or supplemental gas to said sparger system, when necessary, continuously bubbling gas mixture including supplemental gas such as ozone if needed, up through spargers on said sparger system for a plurality of times, treating the liquid inside said chamber for a specific residence time by gas bubble stripping, pH adjustment, chemical reactions (including ozonation, hydrogen peroxide reaction, etc.), and UV reaction, discharging the liquid effluent of said chamber through an outlet with a trap (which prevents external gas intrusion into said chamber) into a storage tank ready for consumption, disposal or further treatment if needed, regenerating said gas phase GAC automatically for reuse periodically, replacing absorbing chemical in said wet scrubber, periodically, and draining and collecting the recovered surface-active foams, VOCs and VICs in liquid form.

Still in accordance with the present invention, a complete apparatus for purifying contaminated liquid containing high concentrations of volatile organic compounds (VOCs), volatile inorganic compounds (VICs), and surfactants comprises in combination:

an influent pump connected to the liquid inlet pipe of said apparatus for pumping said contaminated liquid into said apparatus, through the liquid inlet pipe, chemical feeders connected to said liquid inlet pipe for feeding chemicals to the chemical feed point of said liquid inlet pipe carrying said contaminated liquid, a liquid flow meter connected to said liquid inlet pipe for measuring the liquid flow rate of said contaminated liquid entering said apparatus, a liquid sampling control valve connected to said inlet pipe for liquid sampling and analysis, a liquid flow control valve connected onto said liquid inlet pipe for controlling and adjusting the liquid flow rate, an enclosed dispersed gas stripping chamber connected to said inlet pipe, but after said chemical feeders, said liquid flow meter, said liquid sampling control valve, and said liquid flow control valve, having a sealed enclosure and a bottom thereof as an outside wall of said apparatus, having a liquid inlet for receiving said contaminated liquid and said chemicals from said liquid inlet pipe for liquid treatment, a sparger system disposed horizontally within and near bottom of said enclosed dispersed gas stripping chamber for distribution of gas bubbles through said contaminated liquid for gas stripping, mixing, and flocculation, a gas inlet and a gas pipe connected to the upper wall of said enclosed dispersed gas stripping chamber and said sparger system for transporting gas into said sparger system, a gas outlet and a gas pipe connected to the upper wall of said enclosed dispersed gas stripping chamber but at opposite end of said gas inlet for exiting the emitted gas effluent from said enclosed dispersed gas stripping chamber, ultraviolet (UV) tubes disposed of horizontally within said enclosed dispersed gas stripping chamber but above said sparger system, for disinfection and reduction of volatile organic compounds (VOCs), a vacuum breaker connected on the outside but upper wall of said enclosed dispersed gas stripping chamber for breaking vacuum when required, a vacuum/pressure gauge connected on the outside but upper wall of said enclosed dispersed gas stripping chamber for measuring the gas pressure inside said enclosed dispersed gas stripping chamber, a manhole with cover on the upper wall of said enclosed dispersed gas stripping chamber, allowing a person to enter said enclosed dispersed gas stripping chamber for service, a liquid outlet connected to the side wall of said enclosed dispersed gas stripping chamber at the opposite end of said liquid inlet, for discharge of said liquid treated by said enclosed dispersed gas stripping chamber, a trap connected to said liquid outlet to block outside gas from entering said enclosed dispersed gas stripping chamber, liquid drains located at bottom of said enclosed dispersed gas stripping chamber for draining said liquid from said enclosed dispersed gas stripping chamber when required, a foam collector connected to said gas outlet and said gas pipe for separating foam from said emitted gas effluent, a gas mover connected to said gas pipe but positioned after said foam collector, for providing energy and moving and recycling the emitted gas effluent, a gas flow meter connected to said gas pipe near said gas mover for measuring the gas flow rate passing through said gas mover, a wet scrubber connected to said gas pipe but after both said gas flow meter and said gas mover for removing volatile inorganic compounds (VICs) from said emitted gas effluent, a demister pad connected to said gas pipe after said wet scrubber for removal of moisture or humidity from said emitted gas effluent, a gas inlet sampling port on said gas pipe after said demister for sampling and analysis of the emitted gas effluent before reduction of volatile organic compounds (VOCs) by a VOC condensator and a gas phase granular activated carbon (GAC) contactor, a gas drain (gas relief valve) on said gas pipe after said gas inlet sampling port for draining or bypassing said emitted gas effluent, when required, a VOC condensator and a condensed VOC collector both connected to said gas pipe after said gas drain for removal of VOCs and regeneration of GAC, a gas phase granular activated carbon (GAC) contactor connected to said gas pipe after said VOC condensator and said condensed VOC collector, for further reduction of VOCs from said emitted gas effluent which has been previously purified by said foam collector, wet scrubber, demister pad, and VOC condensator.

a gas outlet sampling port on said gas pipe after said gas phase GAC contactor for sampling and analysis of the gas phase GAC contactor effluent, a gas feed point for supplying additional gas(es) to said gas pipe when required, operating valves connected to said gas pipe between said VOC condensator and said gas phase GAC contactor which are open for normal gas emission control operation, when the regenerating valves are closed, and regenerating valves connected to said gas pipe between said VOC condensator and said gas phase GAC contactor, which are open for regeneration of GAC when the operating valves are closed.

A simplified apparatus of this invention for purifying contaminated liquid containing high concentrations of volatile organic compounds (VOCs), and surfactants comprises all facilities of said complete apparatus in combination, except that the wet scrubber is not activated.

Another simplified apparatus of this invention for purifying contaminated liquid containing high concentrations of volatile organics compounds (VOCs) and volatile inorganic compounds (VICs), comprises all facilities of said complete apparatus, except that the foam collector is not activated.

Still another simplified apparatus of this invention for purifying contaminated liquid containing high concentrations of volatile organic compounds (VOCs), and volatile inorganic compounds (VICs), comprises all facilities of said complete apparatus, except that both the foam collector and the ultraviolet (UV) tubes are not activated.

Still another simplified apparatus of this invention for purifying contaminated liquid containing volatile organic compounds (VOCs) and volatile inorganic compounds (VICs) comprises all facilities of said complete apparatus, except that the foam collector, the VOC condensator, the condensed VOC collector, and the ultraviolet (UV) tubes are not activated.

BRIEF DESCRIPTION OF THE DRAWING FIGURES

There are shown in the drawings embodiments which are presently preferred it being understood, however, that the invention is not limited to the precise arrangements and instrumentalities shown, wherein:

FIG. 2 is a block diagram of a process according to the invention.

DESCRIPTION OF THE PREFERRED EMBODIMENTS

Figure 1:
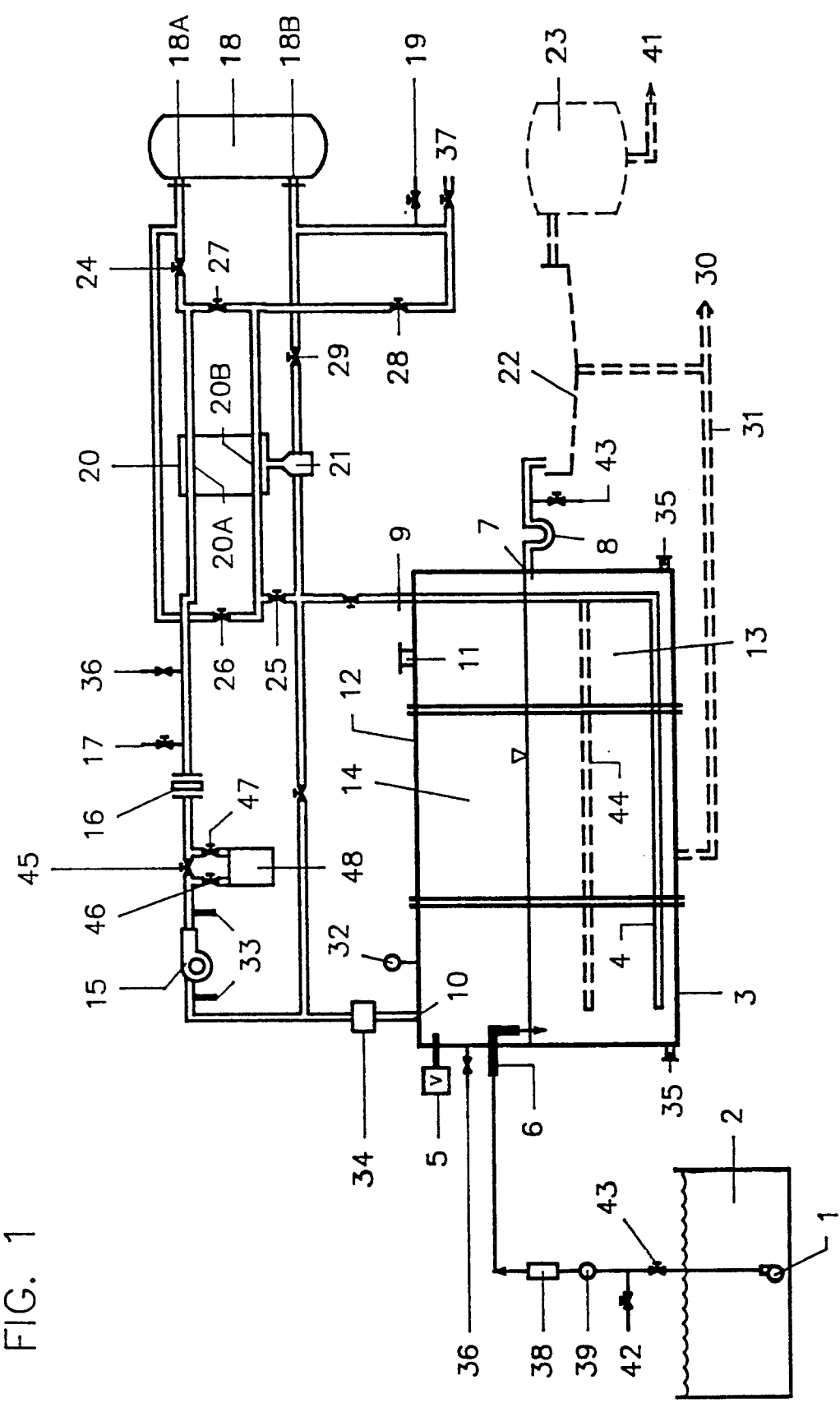
FIG. 1 is a schematic diagram of one embodiment of a process according to the invention.

FIGS. 1 and 2 are schematic diagram and flow diagram, respectively of the present invention, which is used for removal of volatile compounds and surfactants from a contaminated liquid. The liquid is groundwater, surface water, industrial effluent, sewage, landfill leachate, soil washing waste, saline water, or combinations thereof.

Referring to both FIG. 1 and FIG. 2, a liquid sump pump 1 feeds the contaminated liquid 2 through a chemical feed point 39 and a liquid flow meter 38 to an enclosed dispersed gas stripping chamber 3, which is equipped with a sparger system 4, a vacuum breaker 5, a liquid inlet 6, a liquid outlet 7 with trap 8, a gas inlet 9 to the sparger system 4, a gas outlet 10, a manhole cover 11, an enclosure 12, liquid drains 35, ultraviolet (UV) tubes 44, a vacuum-pressure gauge 32, a demister pad 16, a gas mover 15, a foam collector 34, gas release valves 36, a wet scrubber 48, a gas phase GAC contactor 18, a VOC condensator 20, a VOC collector 21, a gas flow meter 33, and many control valves, such as gas sampling control valves 17 & 19, liquid sampling control valves 42, liquid flow control valve 43, and gas emission control valves 24,25,26,27,28,29,45,46 and 47.

The enclosed dispersed gas stripping chamber 3 is constructed to provide sufficient gas head space above liquid level in said chamber 3, and is controlled under turbulent hydraulic conditions achieving total mixing, using coarse, dispersed gas bubbles with diameters greater than 80 microns. Hydraulic residence time is adjusted to conform to different influent liquid flow rates. Gas bubbles from the sparger system 4 passing through liquid inside said chamber 3 entrains volatile organic compounds (VOCs), volatile inorganic compounds (VICs) and surfactants (i.e. surface active agents) from liquid phase 13 into gas phase 14.

The enclosed dispersed gas stripping chamber 3 adopts continuous operation or batch operation and is easily mobilized and demobilized.

The gas 14 in said enclosed dispersed gas stripping chamber 3 containing VOCs and VICs is sucked by the gas mover 15 at the gas outlet 10, and passes through the foam collector 34, the gas flow meter 33, the gas mover 15, the wet scrubber 48, the demister pad 16, the VOC condensator 20, the gas phase GAC contactor 18, the gas inlet 9, and the sparger system 4, thus completing a cycle.

The preferred gas mover 15 is of low pressure ranging from 5 to 15 psi and low volume type ranging from 500 to 1500 scfm. The gas mover 15 is a single unit or multiple units.

The GAC contactor 18 is packed with virgin GAC, regenerated GAC, chemically treated GAC, or combinations thereof. For specific applications, GAC can also be replaced by polymeric adsorbents, activated alumina, ion exchange resin, manganese oxide, magnesium oxide, calcite, dolomite, or combinations thereof. The sparger system 4 is made of nozzles, ejectors, porous plates, porous tubes, mechanical gas distribution units, or combinations thereof.

Any surface-active substances in said liquid generate foam by gas stripping operation. Such foam is condensed and collected by the foam collector 34.

The absorbing chemical in the wet scrubber 48 removes mainly VICs. The demister pad 16 removes liquid droplets.

The dehumidified gas after the demister pad 16 is sampled at the inlet sampling port 17 before the gas stream is further purified by the gas phase granular activated carbon (GAC) contactor 18 mainly for VOCs removal.

The GAC purified gas stream is sampled at an outlet gas sampling port 19, and is recycled to the enclosed dispersed gas stripping chamber 3 via the chamber gas inlet 9 and the sparger system 4 for continuous liquid purification, aiming at total VOCs, VICs and surfactants removal.

Majority of VOCs and VICs in the liquid 13 inside said chamber 3 are removed by gas stripping operation. The remaining VOCs and VICs, iron, manganese, hardness, bacteria, virus, and other pollutants are treated by pH adjustment, chemical reactions (including ozonation, $H_2O_2$ reaction) and UV reaction in said enclosed dispersed gas stripping chamber 3.

Liquid chemicals and gas chemicals are dosed to said chamber 3 for effective chemical reactions: oxygenation with oxygen, ozonation with ozone, oxidation with hydrogen peroxide, oxidation with potassium permanganate, precipitation with lime, precipitation with sulfide, precipitation with hydroxide, flocculation with flocculants, carbonization with carbon dioxide, surface adsorption with surfactants, surface adsorption with adsorbents, or combinations thereof. Sulfuric acid, hydrochloric acid, nitric acid, sodium hydroxide, and potassium hydroxide are effective liquid chemicals used for pH adjustments; while aluminum sulfate, aluminum chloride, magnesium bicarbonate, polymeric aluminum chloride, ferric chloride, ferric sulfate, and sodium aluminate are effective liquid chemicals (flocculants) for flocculation.

The purified liquid in said enclosed dispersed gas stripping chamber 3 flows through the liquid outlet 7 and a trap 8 and is discharged, or further treated by a dissolved air flotation 22 and/or a liquid phase GAC contactor 41.

Entire gas sparging and recycling system shown in FIG. 1 is completely enclosed, thus eliminating any gas emissions or secondary pollution.

The absorbing chemical in the wet scrubber 45 is specific depending on the type and concentration of VICs to be recovered.

The pH adjustment inside said chamber 3 is maintained at a range of 10.8 to 11.5 and the absorbing chemical in said wet scrubber 45 is sulfuric acid, hydrochloric acid, nitric acid, or combinations thereof, for gas stripping removal of ammonia from said liquid. The pH adjustment inside said chamber 3 is maintained at pH below 4.0 and the absorbing chemical in said wet scrubber 45 is sodium bisulfite, sodium sulfite, sodium thiosulfate, or combination thereof, for gas stripping removal of chlorine from said liquid. However, the pH adjustment inside said chamber 3 is maintained at pH below 4.0 and the absorbing chemical in said wet scrubber 45 is sodium hydroxide, potassium hydroxide, or combination thereof, for gas stripping removal of sulfide from said liquid.

The gas phase GAC contactor 18 has a contactor inlet 18A and a contactor outlet 18B, which both are always open. In normal gas emission control operation, the operating valves 46,47,24,28 and 25 are wide open, and the regenerating valves 45,26,27 and 29 are closed. The gas stream transported by said gas mover 15 enters the wet scrubber 45 through the scrubber inlet valve 46, is purified by the absorbing chemical for VICs removal there, exits the wet scrubber 45, passes through the VOC condensator 20 for the first-stage VOC condensation 20A, enters the gas phase GAC contactor 18 at the contactor inlet 18A for VOC adsorption, exists the gas phase GAC contactor 18 from the contactor outlet 18B, passes through the VOC condensator 20 for the second-stage VOC condensation 20B, and finally re-enters the enclosed dispersed gas stripping chamber 3 through the chamber gas inlet 25 for gas stripping operation.

Periodically the gas phase GAC contactor 18 needs to be regenerated for reuse. During regeneration, the operating valves 46,47,24,28 and 25 are closed, the regenerating valves 45,26,27 and 29 are open. The volatile substances in said GAC contactor 18 are desorbed by the gas stream transported by said gas mover 15, condensed by the VOC condensator 20 in a double stage condensation 20B and 20A, and collected by the VOC collector 21.

Supplemental gas (such as ozone) or the make-up gas is fed at the gas feed point 37 during normal gas stripping and gas emission control cycle.

For normal gas stripping operation, air is the most cost-effective source of gas available. Supplemental ozone fed through the gas feed point 37, valves 28 and 25, and the sparger system 4, mixes with air together, produces gas bubbles in said chamber 3 for stripping volatile substances, working together with UV 44, killing bacteria and virus, and removing the remaining VOCs. The combination of bubble stripping, ozonation and UV 44 in one chamber 3 has been proven to be extremely effective for VOCs reduction. The gas bubbles generated from the sparger system 4 also keep the UV tubes 44 clean at all times, in turn, maintaining UV reaction at maximum.

The gas (or gas chemical) is selected from the group consisting of air, oxygen, nitrogen, ozone, chlorine, helium, carbon dioxide, neon, argon, methane, ethane, or combinations thereof.

For energy saving, foam collector 34, wet scrubber 48, UV tubes 44 and VOC condensator 20, of the present invention, can be bypassed or turned off. Specifically foam collector 34 is bypassed when the surfactant concentration in said liquid is low and no foam is produced; wet scrubber 48 is bypassed when the VIC's concentration in said liquid is low and no inorganic compound is volatized; the UV tubes 44 are turned off or idled when the VOC's concentration in said liquid is low and no organic compound is volatized; and VOC condensator is turned off or bypassed if the regenerated GAC is provided.

The present invention relates to a combined liquid treatment and gas emission control process system, using mainly an enclosed dispersed gas stripping chamber, a foam collector, a wet scrubber and a regenerative gas phase granular activated carbon (GAC) contactor, and is specific to removal of volatile organic compounds (VOCs) and volatile inorganic compounds (VICs) from a contaminated liquid. Removal of VOCs by conventional air stripping tower is hindered by cold temperature, iron, manganese, hardness, and biological fouling. Removal of VOCs by conventional liquid phase GAC is hindered by the non-volatile organics and inorganics competing for available adsorption sites on the liquid phase GAC. Neither conventional air stripping tower nor conventional liquid phase GAC contactor is effective for removal and recovery of VICs, and surfactants. Conventional gas phase GAC contactor recovers VOCs, does not recover VICs and foams, and has air emission problem requiring adequate air pollution measures. The present invention represents an improved process and apparatus comprising the steps of pH adjustment, chemical reactions (including ozonation), ultraviolet (UV) reaction, gas stripping, foam separation, wet scrubbing, condensation, adsorption, in one compact reactor for reduction of VOCs, VICs, surfactants, bacteria, virus, and other contaminants from groundwater, surface water, industrial effluents, sewage or saline water.

We claim:

1. An improved method for removing volatile organic compounds (VOCs), volatile inorganic compounds (VICs), and surfactants from a contaminated liquid comprises the following steps:

discharging the contaminated liquid by pumping or gravity into an enclosed dispersed gas stripping chamber (or reactor) which is equipped with a liquid inlet, a liquid outlet, liquid drains, a gas inlet, a gas outlet, gas releases, a sparger system, a vacuum breaker, a manhole with cover, an enclosure, chemical feeders, ultraviolet (UV) tubes, vacuum/-pressure gauges, a demister pad, a liquid flow meter, a gas flow meter, a gas mover, a foam collector, a wet scrubber, a VOC condensator, a condensed VOC collector, a gas phase granular activated carbon (GAC) contactor, operating valves, regenerating valves, sampling ports, and a gas feed point, adjusting the hydraulic residence time to conform to different influent liquid flow rates and providing sufficient gas head space above the liquid level in said enclosed dispersed gas stripping chamber, feeding liquid chemicals and gas chemicals (including ozone) and turning on the UV tubes for combined pH adjustment, chemical reactions and UV reaction in said enclosed dispersed gas stripping chamber, bubbling gas mixture up through spargers (on said sparger system located at bottom of said enclosed dispersed gas stripping chamber) into liquid phase with said gas mover, stripping VOCs and VICs from liquid phase into gas phase in said enclosed dispersed gas stripping chamber by gas bubbles, sucking the gas containing effluent VOSs, VICs and surfactants from the gas outlet of said enclosed dispersed gas stripping chamber by said gas mover, transporting said gas effluent by said gas mover through said foam collector for removal of surfactants, through said wet scrubber for removal of VICs, through said demister pad for removal of liquid droplets, through said VOC condensator for VOCs condensation, through said gas phase granular activated carbon (GAC) contactor for further removal of VOCs, and through the gas inlet for re-entering said sparger system, regenerating GAC in said gas phase GAC contactor automatically for reuse periodically, replacing absorbing chemical in said wet scrubber, periodically, draining and collecting the recovered surface-active foams, VOCs and VICs in liquid form, supplying more said gas to said sparger system, when necessary, continuously bubbling said gas chemicals up through spargers on said sparger system for a plurality of times, treating the liquid inside said enclosed dispersed gas stripping chamber for a specific residence time by gas bubble stripping, pH adjustment, chemical reactions, and UV reaction, and discharging the liquid effluent of said enclosed dispersed gas stripping chamber through an outlet with a trap (which prevents external gas intrusion into said enclosed dispersed gas stripping chamber) into a storage tank ready for consumption, disposal or further treatment if needed.

2. The method of claim 1 wherein the granular activated carbon (GAC) is virgin GAC, regenerated GAC, chemically treated GAC, or combinations thereof.

3. The method of claim 1 wherein the enclosed dispersed gas stripping chamber is of modular construction to be adjusted for treating said liquid at various hydraulic flow rates.

4. The method of claim 1 wherein the liquid is groundwater, surface water, industrial effluent, sewage, landfill leachate, soil washing waste, saline water, or combinations thereof.

5. The method of claim 1 wherein the enclosed dispersed gas stripping chamber adopts continuous operation or batch operation and is easily mobilized and demobilized.

6. The method of claim 1 wherein the gas chemicals are selected from the group consisting of air, oxygen, nitrogen, ozone, chlorine, helium, carbon dioxide, neon, argon, methane, ethane, or combinations thereof.

7. The method of claim 1 wherein the GAC is replaced by polymeric adsorbents, activated alumina, ion exchange resin, manganese oxide, magnesium oxide, calcite, dolomite, or combinations thereof.

8. The method of claim 1 wherein the pH adjustment is maintained at a range of 10.8 to 11.5 and wherein the absorbing chemical is sulfuric acid, hydrochloric acid, nitric acid, or combinations thereof, for gas stripping removal of ammonia from a liquid.

9. The method of claim 1 wherein the pH adjustment is maintained at pH below 4.0 and wherein the absorbing chemical is sodium bisulfite, sodium sulfite, sodium thiosulfate or combinations thereof, for gas stripping removal of chlorine from a liquid.

10. The method of claim 1, wherein the pH adjustment is maintained at pH below 4.0, and wherein the absorbing chemical is sodium hydroxide, potassium hydroxide or combination thereof, for gas stripping removal of sulfide from a liquid.

11. The method of claim 1, wherein the sparger system is made of nozzles, ejectors, porous plates, porous tubes, mechanical gas distribution units, or combinations thereof.

12. The method of claim 1 wherein the liquid chemicals are selected from the group consisting of lime, sodium hydroxide, potassium hydroxide, sulfuric acid, hydrochloric acid, nitric acid, aluminum sulfate, aluminum chloride, sodium carbonate, magnesium bicarbonate, polymeric aluminum chloride, ferric chloride, ferric sulfate, sodium aluminate, polymer, hydrogen peroxide, potassium permanganate, or combinations thereof.

13. The method of claim 1 wherein the gas mover is a single unit or multiple units.

14. The method of claim 1 wherein the enclosed dispersed gas stripping chamber is controlled under turbulent hydraulic conditions achieving total mixing, using coarse, dispersed gas bubbles with diameters greater than 80 microns.

15. The method of claim 1 wherein the foam collector is bypassed when the surfactant concentration in said contaminated liquid is low that no foam is produced in the enclosed dispersed gas stripping chamber.

16. The method of claim 1 wherein the wet scrubber is bypassed when the VICs concentration in said contaminated liquid is low that no inorganic compounds are volatiled in the enclosed dispersed gas stripping chamber.

17. The method of claim 1 wherein the ultraviolet tubes are turned off or idled when the VOCs concentration in said contaminated liquid is low that no organic compounds are volatiled in the enclosed dispersed gas stripping chamber.

18. The method of claim 1 wherein the VOC condensator is turned off or bypassed if the regenerated GAC is provided.

19. The method of claim 1 wherein the chemical reactions are oxygenation with oxygen, ozonation with ozone, oxidation with hydrogen peroxide, oxidation with potassium permanganate, precipitation with lime, precipitation with sulfide, precipitation with hydroxide, flocculation with flocculants, carbonation with carbon dioxide, surface adsorption with surfactants, surface adsorption with adsorbents, or combinations thereof.

20. A complete apparatus of purifying contaminated liquid containing high concentrations of volatile organic compounds (VOCs), volatile inorganic compounds (VICs), and surfactants comprises in combination:

an influent pump connected to a liquid inlet pipe of said apparatus for pumping said contaminated liquid into said apparatus, through the liquid inlet pipe, chemical feeders connected to said liquid inlet pipe for feeding chemicals to a chemical feed point of said liquid inlet pipe carrying said contaminated liquid, a liquid flow meter connected to said liquid inlet pipe for measuring the liquid flow rate of said contaminated liquid entering said apparatus, a liquid sampling control valve connected to said inlet pipe for liquid sampling and analysis, a liquid flow control valve connected onto said liquid inlet pipe for controlling and adjusting the liquid flow rate, an enclosed dispersed gas stripping chamber connected to said liquid inlet pipe, but after said chemical feeders, said liquid flow meter, said liquid sampling control valve, and said liquid flow control valve, having a sealed enclosure and a bottom thereof as an outside wall of said apparatus, and having a liquid inlet for receiving said contaminated liquid and said chemicals from said liquid inlet pipe for liquid treatment, a sparger system disposed horizontally within and near bottom of said enclosed dispersed gas stripping chamber for distribution of gas bubbles through said contaminated liquid for gas stripping, mixing, and flocculation, a gas inlet and a gas pipe connected to the upper wall of said enclosed dispersed gas stripping chamber and said sparger system for transporting gas into said sparger system, a gas outlet and a gas pipe connected to the upper wall of said enclosed dispersed gas stripping chamber but at opposite end of said gas inlet for exiting the emitted gas effluent from said enclosed dispersed gas stripping chamber, ultraviolet (UV) tubes disposed of horizontally within said enclosed dispersed gas stripping chamber but above said sparger system, for disinfection and reduction of volatile organic compounds (VOCs), a vacuum breaker connected on the outside but upper wall of said enclosed dispersed gas stripping chamber for breaking vacuum when required, a vacuum/pressure gauge connected on the outside but upper wall of said enclosed dispersed gas stripping chamber for measuring the gas pressure inside said enclosed dispersed gas stripping chamber, a manhole with cover on the upper wall of said enclosed dispersed gas stripping chamber, allowing a person to enter said enclosed dispersed gas stripping chamber for service, a liquid outlet connected to the side wall of said enclosed dispersed gas stripping chamber at the opposite end of said liquid inlet, for discharge of said liquid treated by said enclosed dispersed gas stripping chamber, a trap connected to said liquid outlet to block outside gas from entering said enclosed dispersed gas stripping chamber, liquid drains located at bottom of said enclosed dispersed gas stripping chamber for draining said liquid from said enclosed dispersed gas stripping chamber when required, a foam collector connected to said gas outlet and said gas pipe for separating foam from said emitted gas effluent, a gas mover connected to said gas pipe but positioned after said foam collector, for providing energy and moving and recycling the emitted gas effluent, a gas flow meter connected to said gas pipe near said gas mover for measuring the gas flow rate passing through said gas mover, a wet scrubber connected to said gas pipe but after both said gas flow meter and said gas mover for removing volatile inorganic compounds (VICs) from said emitted gas effluent, a demister pad connected to said gas pipe after said wet scrubber for removal of moisture or humidity from said emitted gas effluent, a gas inlet sampling port on said gas pipe after said demister for sampling and analysis of the emitted gas effluent before reduction of volatile organic compounds (VOCs) by a VOC condensator and a gas phase granular activated carbon (GAC) contactor, a gas drain (gas relief valve) on said gas pipe after said gas inlet sampling port for draining or bypassing said emitted gas effluent, when required, a VOC condensator and a condensed VOC collector both connected to said gas pipe after said gas drain for removal of VOCs and regeneration of GAC, a gas phase granular activated carbon (GAC) contactor connected to said gas pipe after said VOC condensator and said condensed VOC collector, for further reduction of VOCs from said emitted gas effluent which has been previously purified by said foam collector, wet scrubber, demister pad, and VOC condensator, a gas outlet sampling port on said gas pipe after said gas phase GAC contactor for sampling and analysis of the gas phase GAC contactor effluent, a gas feed point for supplying additional gas(es) to said gas pipe when required, operating valves connected to said gas pipe between said VOC condensator and said gas phase GAC contactor and being open for normal gas emission control operation, when regenerating valves are closed, and the regenerating valves connected to said gas pipe between said VOC condensator and said gas phase GAC contactor, and being open for regeneration of GAC when the operating valves are closed.

21. The apparatus of claim 20 wherein the gas is selected from the group consisting of ozone, chlorine, sulfur dioxide, hydrogen sulfide, carbon dioxide, oxygen, nitrogen, helium, neon, argon, methane, ethane, or combinations thereof.

22. An apparatus of purifying contaminated liquid containing high concentrations of volatile organic compounds (VOCs), and surfactants comprises in combination:

an influent pump connected to a liquid inlet pipe of said apparatus for pumping said contaminated liquid into said apparatus, through the liquid inlet pipe, chemical feeders connected to said liquid inlet pipe for feeding chemicals to a chemical feed point of said liquid inlet pipe carrying said contaminated liquid, a liquid flow meter connected to said liquid inlet pipe for measuring the liquid flow rate of said contaminated liquid entering said apparatus, a liquid sampling control valve connected to said liquid inlet pipe for liquid sampling and analysis, a liquid flow control valve connected onto said liquid inlet pipe for controlling and adjusting the liquid flow rate, an enclosed dispersed gas stripping chamber connected to said liquid inlet pipe, but after said chemical feeders, said liquid flow meter, said liquid sampling control valve, and said liquid flow control valve, having a sealed enclosure and a bottom thereof as an outside wall of said apparatus, and having a liquid inlet for receiving said contaminated liquid and said chemicals from said liquid inlet pipe for liquid treatment, a sparger system disposed horizontally within and near bottom of said enclosed dispersed gas stripping chamber for distribution of gas bubbles through said contaminated liquid for gas stripping, mixing, and flocculation, a gas inlet and a gas pipe connected to the upper wall of said enclosed dispersed gas stripping chamber and said sparger system for transporting gas into said sparger system, a gas outlet and a gas pipe connected to the upper wall of said enclosed dispersed gas stripping chamber but at opposite end of said gas inlet for exiting the emitted gas effluent from said enclosed dispersed gas stripping chamber, ultraviolet (UV) tubes disposed of horizontally within said enclosed dispersed gas stripping chamber but above said sparger system, for disinfection and reduction of volatile organic compounds (VOCs), a vacuum breaker connected on the outside but upper wall of said enclosed dispersed gas stripping chamber for breaking vacuum when required, a vacuum/pressure gauge connected on the outside but upper wall of said enclosed dispersed gas stripping chamber for measuring the gas pressure inside said enclosed dispersed gas stripping chamber, a manhole with cover on the upper wall of said enclosed dispersed gas stripping chamber, allowing a person to enter said enclosed dispersed gas stripping chamber for service, a liquid outlet connected to the side wall of said enclosed dispersed gas stripping chamber at the opposite end of said liquid inlet, for discharge of said liquid treated by said enclosed dispersed gas stripping chamber, a trap connected to said liquid outlet to block outside gas from entering said enclosed dispersed gas stripping chamber, liquid drains located at bottom of said enclosed dispersed gas stripping chamber for draining said liquid from said enclosed dispersed gas stripping chamber when required, a foam collector connected to said gas outlet and said gas pipe for separating foam from said emitted gas effluent, a gas mover connected to said gas pipe but positioned after said foam collector, for providing energy and moving and recycling the emitted gas effluent, a gas flow meter connected to said gas pipe near said gas mover for measuring the gas flow rate passing through said gas mover, a demister pad connected to said gas pipe after said gas flow meter and said gas mover for removal of moisture or humidity from said emitted gas effluent, a gas inlet sampling port on said gas pipe after said demister for sampling and analysis of the emitted gas effluent before reduction of volatile organic compounds (VOCs) by a VOC condensator and a gas phase granular activated carbon (GAC) contactor, a gas drain (gas relief valve) on said gas pipe after said gas inlet sampling port for draining or bypassing said emitted gas effluent, when required, a VOC condensator and a condensed VOC collector both connected to said gas pipe after said gas drain for removal of VOCs and regeneration of GAC, a gas phase granular activated carbon (GAC) contactor connected to said gas pipe after said VOC condensator and said condensed VOC collector, for further reduction of VOCs from said emitted gas effluent which has been previously purified by said foam collector, demister pad, and VOC condensator, a gas outlet sampling port on said gas pipe after said gas phase GAC contactor for sampling and analysis of the gas phase GAC contactor effluent, a gas feed point for supplying additional gas(es) to said gas pipe when required, operating valves connected to said gas pipe between said VOC condensator and said gas phase GAC contactor and being open for normal gas emission control operation, when regenerating valves are closed, and the regenerating valves connected to said gas pipe between said VOC condensator and said gas phase GAC contactor, and being open for regeneration of GAC when the operating valves are closed.

23. An apparatus of purifying contaminated liquid containing high concentrations of volatile organic compounds (VOCs) and volatile inorganic compounds (VICs), comprises in combination:

an influent pump connected to a liquid inlet pipe of said apparatus for pumping said contaminated liquid into said apparatus, through the liquid inlet pipe, chemical feeders connected to said liquid inlet pipe for feeding chemicals to a chemical feed point of said liquid inlet pipe carrying said contaminated liquid, a liquid flow meter connected to said liquid inlet pipe for measuring the liquid flow rate of said contaminated liquid entering said apparatus, a liquid sampling control valve connected to said liquid inlet pipe for liquid sampling and analysis, a liquid flow control valve connected onto said liquid inlet pipe for controlling and adjusting the liquid flow rate, an enclosed dispersed gas stripping chamber connected to said liquid inlet pipe, but after said chemical feeders, said liquid flow meter, said liquid sampling control valve, and said liquid flow control valve, having a sealed enclosure and a bottom thereof as an outside wall of said apparatus, and having a liquid inlet for receiving said contaminated liquid and said chemicals from said liquid inlet pipe for liquid treatment, a sparger system disposed horizontally within and near bottom of said enclosed dispersed gas stripping chamber for distribution of gas bubbles through said contaminated liquid for gas stripping, mixing, and flocculation, a gas inlet and gas pipe connected to the upper wall of said enclosed dispersed gas stripping chamber and said sparger system for transporting gas into said sparger system, a gas outlet and gas pipe connected to the upper wall of said enclosed dispersed gas stripping chamber but at opposite end of gas inlet for exiting the emitted gas effluent from said enclosed dispersed gas stripping chamber, ultraviolet (UV) tubes disposed of horizontally within said enclosed dispersed gas stripping chamber but above said sparger system, for disinfection and reduction of volatile organic compounds (VOCs), a vacuum breaker connected on the outside but upper wall of said enclosed dispersed gas stripping chamber for breaking vacuum when required, a vacuum/pressure gauge connected on the outside but upper wall of said enclosed dispersed gas stripping chamber for measuring the gas pressure inside said enclosed dispersed gas stripping chamber, a manhole with cover on the upper wall of said enclosed dispersed gas stripping chamber, allowing a person to enter said enclosed dispersed gas stripping chamber for service, a liquid outlet connected to the side wall of said enclosed dispersed gas stripping chamber at the opposite end of said liquid inlet, for discharge of said liquid treated by said enclosed dispersed gas stripping chamber, a trap connected to said liquid outlet to block outside gas from entering said enclosed dispersed gas stripping chamber, liquid drains located at bottom of said enclosed dispersed gas stripping chamber for draining said liquid from said enclosed dispersed gas stripping chamber when required, a gas mover connected to said gas pipe but positioned after said gas inlet, for providing energy and moving and recycling the emitted gas effluent, a gas flow meter connected to said gas pipe near said gas mover for measuring the gas flow rate passing through said gas mover, a wet scrubber connected to said gas pipe but after both said gas flow meter and said gas mover for removing volatile inorganic compounds (VICs) from said emitted gas effluent, a demister pad connected to said gas pipe after said wet scrubber for removal of moisture or humidity from said emitted gas effluent, a gas inlet sampling port on said gas pipe after said demister for sampling and analysis of the emitted gas effluent before reduction of volatile organic compounds (VOCs) by a VOC condensator and a gas phase granular activated carbon (GAC) contactor, a gas drain (gas relief valve) on said gas pipe after said gas inlet sampling port for draining or bypassing said emitted gas effluent, when required, a VOC condensator and a condensed VOC collector both connected to said gas pipe after said gas drain for removal of VOCs and regeneration of GAC, a gas phase granular activated carbon (GAC) contactor connected to said gas pipe after said VOC condensator and said condensed VOC collector, for further reduction of VOCs from said emitted gas effluent which has been previously purified by said wet scrubber, demister pad, and VOC condensator, a gas outlet sampling port on said gas pipe after said gas phase GAC contactor for sampling and analysis of the gas phase GAC contactor effluent, a gas feed point for supplying additional gas(es) to said gas pipe when required, operating valves connected to said gas pipe between said VOC condensator and said gas phase GAC contactor and being open for normal gas emission control operation, when regenerating valves are closed, and the regenerating valves connected to said gas pipe between said VOC condensator and said gas phase GAC contactor, and being open for regeneration of GAC when the operating valves are closed.

24. An apparatus of purifying contaminated liquid containing high concentrations of volatile organic compounds (VOCs), and volatile inorganic compounds (VICs), comprises in combination:

an influent pump connected to a liquid inlet pipe of said apparatus for pumping said contaminated liquid into said apparatus, through the liquid inlet pipe, chemical feeders connected to said liquid inlet pipe for feeding chemicals to a chemical feed point of said liquid inlet pipe carrying said contaminated liquid, a liquid flow meter connected to said liquid inlet pipe for measuring the liquid flow rate of said contaminated liquid entering said apparatus, a liquid sampling control valve connected to said liquid inlet pipe for liquid sampling and analysis, a liquid flow control valve connected onto said liquid inlet pipe for controlling and adjusting the liquid flow rate, an enclosed dispersed gas stripping chamber connected to said liquid inlet pipe, but after said chemical feeders, said liquid flow meter, said liquid sampling control valve, and said liquid flow control valve, having a sealed enclosure and a bottom thereof as an outside wall of said apparatus, and having a liquid inlet for receiving said contaminated liquid and said chemicals from said liquid inlet pipe for liquid treatment, a sparger system disposed horizontally within and near bottom of said enclosed dispersed gas stripping chamber for distribution of gas bubbles through said contaminated liquid for gas stripping, mixing, and flocculation, a gas inlet and a gas pipe connected to the upper wall of said enclosed dispersed gas stripping chamber and said sparger system for transporting gas into said sparger system, a gas outlet and a gas pipe connected to the upper wall of said enclosed dispersed gas stripping chamber but at opposite end of said gas inlet for exiting the emitted gas effluent from said enclosed dispersed gas stripping chamber, a vacuum breaker connected on the outside but upper wall of said enclosed dispersed gas stripping chamber for breaking vacuum when required, a vacuum/pressure gauge connected on the outside but upper wall of said enclosed dispersed gas stripping chamber for measuring the gas pressure inside said enclosed dispersed gas stripping chamber, a manhole with cover on the upper wall of said enclosed dispersed gas stripping chamber, allowing a person to enter said enclosed dispersed gas stripping chamber for service, a liquid outlet connected to the side wall of said enclosed dispersed gas stripping chamber at the opposite end of said liquid inlet, for discharge of said liquid treated by said enclosed dispersed gas stripping chamber, a trap connected to said liquid outlet to block outside gas from entering said enclosed dispersed gas stripping chamber, liquid drains located at bottom of said enclosed dispersed gas stripping chamber for draining said liquid from said enclosed dispersed gas stripping chamber when required, a gas mover connected to said gas pipe but positioned after said gas inlet, for providing energy and moving and recycling the emitted gas effluent, a gas flow meter connected to said gas pipe near said gas mover for measuring the gas flow rate passing through said gas mover, a wet scrubber connected to said gas pipe but after both said gas flow meter and said gas mover for removing volatile inorganic compounds (VICs) from said emitted gas effluent, a demister pad connected to said gas pipe after said wet scrubber for removal of moisture or humidity from said emitted gas effluent, a gas inlet sampling port on said gas pipe after said demister for sampling and analysis of the emitted gas effluent before reduction of volatile organic compounds (VOCs) by a VOC condensator and a gas phase granular activated carbon (GAC) contactor, a gas drain (gas relief valve) on said gas pipe after said gas inlet sampling port for draining or bypassing said emitted gas effluent, when required, a VOC condensator and a condensed VOC collector both connected to said gas pipe after said gas drain for removal of VOCs and regeneration of GAC, a gas phase granular activated carbon (GAC) contactor connected to said gas pipe after said VOC condensator and said condensed VOC collector, for further reduction of VOCs from said emitted gas effluent which has been previously purified by said wet scrubber, demister pad, and VOC condensator, a gas outlet sampling port on said gas pipe after said gas phase GAC contactor for sampling and analysis of the gas phase GAC contactor effluent, a gas feed point for supplying additional gas(es) to said gas pipe when required, operating valves connected to said gas pipe between said VOC condensator and said gas phase GAC contactor and being open for normal gas emission control operation, when regenerating valves are closed, and the regenerating valves connected to said gas pipe between said VOC condensator and said gas phase GAC contactor, and being open for regeneration of GAC when the operating valves are closed.

25. An apparatus of purifying contaminated liquid containing high concentrations of volatile organic compounds (VOCs) and volatile inorganic compounds (VICs) comprises in combination:

an influent pump connected to a liquid inlet pipe of said apparatus for pumping said contaminated liquid into said apparatus, through the liquid inlet pipe, chemical feeders connected to said liquid inlet pipe for feeding chemicals to a chemical feed point of said liquid inlet pipe carrying said contaminated liquid, a liquid flow meter connected to said liquid inlet pipe for measuring the liquid flow rate of said contaminated liquid entering said apparatus, a liquid sampling control valve connected to said liquid inlet pipe for liquid sampling and analysis, a liquid flow control valve connected onto said liquid inlet pipe for controlling and adjusting the liquid flow rate, an enclosed dispersed gas stripping chamber connected to said liquid inlet pipe, but after said chemical feeders, said liquid flow meter, said liquid sampling control valve, and said liquid flow control valve, having a sealed enclosure and a bottom thereof as an outside wall of said apparatus, and having a liquid inlet for receiving said contaminated liquid and said chemicals from said liquid inlet pipe for liquid treatment, a sparger system disposed horizontally within and near bottom of said enclosed dispersed gas stripping chamber for distribution of gas bubbles through said contaminated liquid for gas stripping, mixing, and flocculation, a gas inlet and a gas pipe connected to the upper wall of said enclosed dispersed gas stripping chamber and said sparger system for transporting gas into said sparger system, a gas outlet and a gas pipe connected to the upper wall of said enclosed dispersed gas stripping chamber but at opposite end of said gas inlet for exiting the emitted gas effluent from said enclosed dispersed gas stripping chamber, a vacuum breaker connected on the outside but upper wall of said enclosed dispersed gas stripping chamber for breaking vacuum when required, a vacuum/pressure gauge connected on the outside but upper wall of said enclosed dispersed gas stripping chamber for measuring the gas pressure inside said enclosed dispersed gas stripping chamber, a manhole with cover on the upper wall of said enclosed dispersed gas stripping chamber, allowing a person to enter said enclosed dispersed gas stripping chamber for service, a liquid outlet connected to the side wall of said enclosed dispersed gas stripping chamber at the opposite end of said liquid inlet, for discharge of said liquid treated by said enclosed dispersed gas stripping chamber, a trap connected to said liquid outlet to block outside gas from entering said enclosed dispersed gas stripping chamber, liquid drains located at bottom of said enclosed dispersed gas stripping chamber for draining said liquid from said enclosed dispersed gas stripping chamber when required, a gas mover connected to said gas pipe but positioned after said gas inlet, for providing energy and moving and recycling the emitted gas effluent, a gas flow meter connected to said gas pipe near said gas mover for measuring the gas flow rate passing through said gas mover, a wet scrubber connected to said gas pipe but after both said gas flow meter and said gas mover for removing volatile inorganic compounds (VICs) from said emitted gas effluent, a demister pad connected to said gas pipe after said wet scrubber for removal of moisture or humidity from said emitted gas effluent, a gas inlet sampling port on said gas pipe after said demister for sampling and analysis of the emitted gas effluent before reduction of volatile organic compounds (VOCs) by a gas phase granular activated carbon (GAC) contactor, a gas drain (gas relief valve) on said gas pipe after said gas inlet sampling port for draining or bypassing said emitted gas effluent, when required, a gas phase granular activated carbon (GAC) contactor connected to said gas pipe after said gas drain, for reduction of VOCs from said emitted gas effluent which has been previously purified by said wet scrubber and demister pad, a gas outlet sampling port on said gas pipe after said gas phase GAC contactor for sampling and analysis of the gas phase GAC contactor effluent, and a gas feed point for supplying additional gas(es) to said gas pipe when required.

* * * * *